US010140818B2

(12) United States Patent
Johnson

(10) Patent No.: US 10,140,818 B2
(45) Date of Patent: Nov. 27, 2018

(54) PROVIDING A SECONDARY SERVICE FOR A CLIENT APPLICATION WHICH IS ASSOCIATED WITH A PRIMARY SERVICE

(71) Applicant: Sam Johnson, Las Vegas, NV (US)

(72) Inventor: Sam Johnson, Las Vegas, NV (US)

( * ) Notice: Subject to any disclaimer, the term of this patent is extended or adjusted under 35 U.S.C. 154(b) by 0 days.

(21) Appl. No.: 15/664,212

(22) Filed: Jul. 31, 2017

(65) Prior Publication Data

US 2017/0330409 A1 Nov. 16, 2017

Related U.S. Application Data

(62) Division of application No. 14/336,935, filed on Jul. 21, 2014, now Pat. No. 9,734,670.

(51) Int. Cl.
*G06F 17/00* (2006.01)
*G07F 17/32* (2006.01)

(52) U.S. Cl.
CPC ........ *G07F 17/329* (2013.01); *G07F 17/3225* (2013.01); *G07F 17/3255* (2013.01)

(58) Field of Classification Search
None
See application file for complete search history.

(56) References Cited

U.S. PATENT DOCUMENTS

| | | | | |
|---|---|---|---|---|
| 4,669,730 | A | 6/1987 | Small | |
| 4,815,741 | A | 3/1989 | Small | |
| 5,734,838 | A | 3/1998 | Robinson et al. | |
| 5,823,879 | A | 10/1998 | Goldberg | |
| 6,260,758 | B1 | 7/2001 | Blumberg | |
| 6,264,560 | B1 | 7/2001 | Goldberg | |
| 6,454,647 | B1 | 9/2002 | Woodbury, Jr. | |
| 7,025,674 | B2 | 4/2006 | Adams et al. | |
| 7,421,410 | B1 | 9/2008 | Schechtman | |
| 7,702,553 | B1 | 4/2010 | Dickelman | |
| 7,702,577 | B1 | 4/2010 | Dickelman | |
| 7,784,682 | B2 | 8/2010 | Taylor et al. | |
| 7,827,056 | B2 | 11/2010 | Walker et al. | |
| 7,827,057 | B1 | 11/2010 | Walker et al. | |
| RE44,323 | E | 6/2013 | Goldberg | |
| 8,556,707 | B2 | 10/2013 | Potts et al. | |
| 8,608,061 | B2 | 12/2013 | Krajicek et al. | |
| 9,734,670 | B2 | 8/2017 | Johnson | |
| 2004/0102242 | A1 * | 5/2004 | Poelmann | G06F 7/582 463/22 |
| 2005/0221841 | A1 * | 10/2005 | Piccionelli | H04W 48/04 455/456.3 |
| 2009/0017893 | A1 * | 1/2009 | Carson | G07F 17/32 463/17 |
| 2009/0287579 | A1 * | 11/2009 | Walker | G06Q 20/18 705/21 |

(Continued)

*Primary Examiner* — Paul A D'Agostino
(74) *Attorney, Agent, or Firm* — Weide & Miller, Ltd.

(57) ABSTRACT

A secondary service provides a second, or collateral, service in connection with a client application associated with a first service. The secondary service receives user input from the client application and forwards the user input to at least one second server for the collateral service. The collateral service may be a lottery gaming system that generates or receives lottery entries as users perform certain actions. Other non-limiting examples of a collateral service that may receive user input via the secondary service include a data mining system, an advertising system, a loyalty and bonus system.

14 Claims, 11 Drawing Sheets

(56) References Cited

U.S. PATENT DOCUMENTS

| | | | | |
|---|---|---|---|---|
| 2010/0210352 | A1 | 8/2010 | Ansari | |
| 2010/0304848 | A1 | 12/2010 | Detlefsen | |
| 2011/0263318 | A1* | 10/2011 | Agarwal ................ | G06Q 20/32 463/25 |
| 2012/0214564 | A1* | 8/2012 | Barclay ............... | G07F 17/3227 463/11 |
| 2013/0006745 | A1 | 1/2013 | Potts | |
| 2013/0042262 | A1* | 2/2013 | Riethmueller .... | G06F 17/30846 725/14 |

* cited by examiner

PROVIDING A SECONDARY SERVICE FOR A CLIENT APPLICATION WHICH IS ASSOCIATED WITH A PRIMARY SERVICE

RELATED APPLICATION DATA

The present invention is a divisional of U.S. patent application Ser. No. 14/336,935, filed Jul. 21, 2014, the contents of which are incorporated entirely herein by reference.

FIELD OF THE INVENTION

The present invention relates generally to both the gaming industry and telephone and/or network technology and, more particularly, to providing a secondary service for forwarding user input from a client application to a first service, such as a telecommunications service, and to a different service, or second service, such as a lottery system that may generate lottery entries using the user input received from one or more participants, which lottery entries may be based on user input comprising sequences entered or generated by participants utilizing the network for performing and action such as placing a call on a telephony network or concluding an online transaction using the Internet.

BACKGROUND OF THE INVENTION

Years ago, the word "churn" would conjure up wonderful visions of a motherly woman, working away over a clay pot, making butter for her family. Today, the mention of the word is quite different, especially for those in the communications industry. The word "churn" to a telecommunications service provider causes a cold, tingly feeling to run up and down their spine and causes the hairs on their neck to stand-up. In the telecommunications industry, churn refers a customer leaving one service provider and transitioning to another. The telecommunications industry is constantly looking for techniques to reduce their churn rate.

Some techniques that have been employed to reduce churn include providing financial incentives such as discounts and free services, the addition of new features, and upgrading equipment. Although these techniques, as well as other techniques have been instrumental in reducing churn, service provider companies are still in need of new and innovative techniques for reducing churn. Thus, there remains in the telecommunications industry a need for new and innovative techniques to decrease churn.

Churn is especially evident in the cellular telephone industry. Cellular service providers offer free minutes, roll-over minutes, free telephone upgrades and feature rich packages in an effort to attract and retain customers. Along with the churn issue, the cellular industry also faces another challenge—maximizing minute usage. Because cellular service providers generate revenue based on the number of minutes of talk time of their customers, the service providers are very motivated to increase the minute usage of their customer base. Increasing the minutes of usage of a cellular telephone service subscriber really includes two facets. One facet is focused on lengthening the duration of telephone calls and the other is focused on increasing the number of telephone calls. Thus, there is a need in the art for a technique to provide an incentive to cellular telephone customers that will discourage churn and encourage the users to place more calls and/or to extend the length of their calls.

Furthermore, when you look at a cellular telephone from a systems perspective, one realizes that a cellular telephone is actually a two-way radio and a computer. Because of this particular structure, cellular telephones have migrated into complex devices combining widely divergent technologies, such as MP3 players, cameras, personal assistants, Internet browsers, email applications, game platforms, and/or the like, with the cellular telephone technology. This has resulted in opening a wide array of techniques that can be employed to reduce churn and increase the number of usage minutes for cellular service subscribers.

The concept of churn can also be applied in many other settings other than telecommunications settings. For instance, online merchants greatly desire the attraction of customer traffic. For instance, online merchants such as EBAY, AMAZON.COM, OVERSTOCK.COM and many others could benefit from a technique that would encourage consumers to use their site and to return to their site next time a transaction is desired.

SUMMARY OF THE INVENTION

The present invention provides a solution to the above-described needs in the art and other needs in the art by providing a secondary service for use in providing a second, or collateral, service in connection with a client application associated with a first service. The secondary service may receive user input from the client application, forward the user input to at least one application server for performing the first service and forward the user input to at least one second server configured to provide the second service. The second service may be a lottery gaming system that generates or receives lottery entries as users perform certain actions. Other non-limiting examples of a second service that may receive user input via the secondary service include a data mining system, an advertising system, an award provisioning system, a loyalty and bonus system and/or the like. The client application might be a telecommunications application, and actions taken by a subscriber to the secondary service may result in an entry to a lottery-like game offered by a lottery system, which provides the second service.

In general, users of client applications, each client application of which may be used in connection with a first service, such as a telecommunication service a social media network service, etc., may opt in to, or subscribe to or participate in, one or more collateral services via a secondary service. One such collateral service comprises a lottery system, which may provide a lottery-like game. For instance, in one embodiment of the present invention, the action could be an action completely independent from the lottery game and common for standard usage of the service (i.e., dialing a telephone number). In another embodiment of the invention, the user, or subscriber, may take specific actions that are related to or directed towards generating lottery entries. In either case, the subscriber's action may result in one or more entries being generated for a lottery game.

In accordance with one or more embodiments, a secondary service, or secondary, allows actions to be performed to create lottery entries using any of a number of primary service client applications, including but not limited to social networking applications, such as Facebook™ Twitter™, Instagram™, Spotify™, Snapchat™, LinkedIn™, Vine™, and/or the like, phone applications, messaging applications, such as email, text messaging, short messaging, and/or the like, as well as other telecommunications applications, such as FaceTime™, Skype™, and/or the like. A subscriber may identify one or more primary service client applications to be used with the secondary service. The secondary service may operate to notify the lottery system of an action performed using an identified application so that an entry into a lottery like game of the lottery system may be created for the action.

Entries are collected by the lottery system for a period of time and then a drawing is performed. While collecting the entries, each entry collected is associated with the identity of the subscriber and then stored for later reference. When the game period expires, a winning sequence is identified and then compared to the entries into the game. If there is a match, the winners are provided an award. The award is typically based on a predefined payout table. The winning sequence can be generated randomly from the total domain of possible outcomes or, in some embodiments, may be generated from the domain of recorded entries randomly selected. In this latter embodiment, each lottery event can be guaranteed to produce at least one winner.

Other examples of collateral services, or systems, include without limitation an advertising system, a data mining system, an awards provisioning system and a loyalty and bonus feature system.

These and other aspects, features and embodiments of the present invention are more fully described in the detailed description that follows.

DETAILED DESCRIPTION OF THE INVENTION

Figure 1:
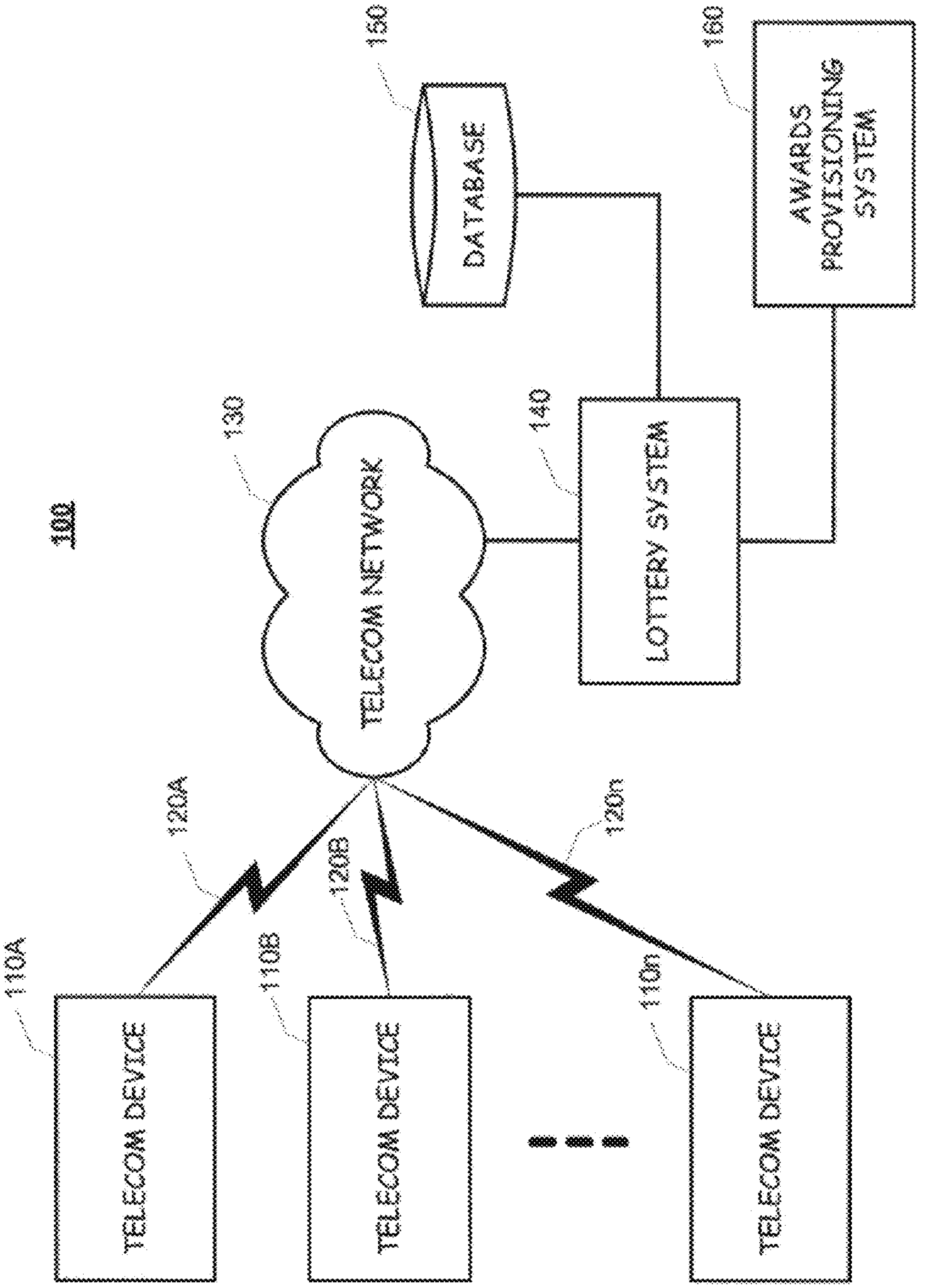
FIG. 1 is a system diagram illustrating a generic environment in which embodiments of the present invention can be deployed.

The present invention is directed towards a secondary service for use with a first, or primary, service associated with a client application and at least one second, or collateral service, or system, which is different from the first service. By way of a non-limiting example, a second, or collateral, service may comprise a lottery system configured to provide at least one lottery-like game, and the first service provides a primary service associated with a client application, or app. The primary service may comprise a telecommunication service provided by one or more telecommunication service providers. Other non-limiting examples of a primary service may involve a social media network and site and any primary service provided by one or more servers that compose the site; a primary service may be in connection with any usage or activity in a social media client app including without limitation opening the social media client app, posting content, such as a picture, blog post, annotation, critique, message, etc., to the social media network site using the client app, submitting a social media request, such as a follow, friend, like, etc. request. Examples of social media network sites include without limitation Facebook™, Twitter™, Instagram™, Spotify™, Snapchat™, LinkedIn™, Vine™, and/or the like. Advantageously, provisioning of the second service different from the first reduces churn and/or increases system usage in connection with the first service.

In addition, embodiments of the present invention can also be offered by non-telecommunication service providers simply as a promotional activity, revenue generator, recreation, etc. In general, the present invention may provide a user access to a second service simply by using the first service. For example, a user is provided access to a lottery-like game by using at least one telecommunication system. In accordance with one or more embodiments, a secondary service, may be used to provide the user access to the second service.

One or more embodiments comprise a secondary service for use in providing a second, or collateral, service in connection with a client application associated with a first service. The secondary service may receive user input from the client application, forward the user input to at least one application server for performing the first service and forward the user input to at least one second server for the second service. The second service may be a lottery gaming system that generates or receives lottery entries as users perform certain actions. Other non-limiting examples of a second service that may receive user input via the secondary service include a data mining system, an advertising system, an award provisioning system, a loyalty and bonus system and/or the like.

With a collateral service providing a lottery system, subscribers may be provided access to the lottery system via a secondary service. The lottery system may offer one or more lottery-like games for participation by users via the secondary service. Lottery game entries, or entry sequences, may be collected over a period of time via the secondary service. By way of a non-limiting example, an entry may be made for a subscriber in connection with a call, email message, text message, etc. made by or to the subscriber. At the conclusion of the period of time, the entered sequences are compared to a winning sequence to determine if there are any winners and to identify the winner(s). The lottery system may generate an entry for the subscriber in response to an action taken, e.g. performing an operation, by the subscriber in connection with a first service, such as that provided by a telecommunications system. For example, a subscriber to a telecommunications system can enter, select or generate a sequence for the lottery-like game simply by performing standard and expected operations with the telecommunications equipment, or by performing non-standard, game-specific activities. For instance, a standard and expected operation in a cellular telephone based telecommunications system would be the dialing of a destination telephone number, initiating a message, such as a text message, to one or more recipients. On the other hand, a non-standard, game-specific activity may include entering a sequence of digits after being prompted by the telephone display or the telecommunications system. A period of time is defined for the entry of sequences. Upon the expiration of the period of time, either one of the entered sequences is selected as a winning sequence or, a random sequence is generated and compared to the entered sequences to identify a winner. A payout table can be utilized to establish the winning criteria and the awards to winners.

Now turning to the figures, further details, aspects, embodiments and features of the present invention are described in more detail.

FIG. 1 is a system diagram illustrating a generic environment in which embodiments of the present invention can be deployed. The environment 100 is a telecommunications system that includes one or more end-user devices 110A-110*n* that are communicatively coupled to the telecommunications network infrastructure 130 through communication channels or media 120A-120*n*. A lottery system 140 is also coupled to the telecommunications network infrastructure. The lottery system 140 interfaces to a database 150 or other memory system or device for providing data storage and optionally an awards provisioning system 160.

It will be appreciated that the generic environment can represent a variety of specific environments such as the public switched telephone network (PSTN), a cellular 30 telephone network, a voice over IP (VOIP) network, a data network, a message-centric network, such as and without limitation an email-centric network, and/or the like. Further, it will be appreciated that the telecommunications network cloud 130 may represent a combination of two or more similar and very different network types. For instance, the lottery system 140 may interface to the PSTN infrastructure, a cellular infrastructure and a VOIP infrastructure. In accordance with one or more embodiments, the lottery system 140 may interface with one or more such infrastructures using one or more proxies. Thus, the telecommunication cloud 130 may represent multiple infrastructures or the lottery system 140 may be connected to multiple network clouds 130, and lottery system 140 may be connected to multiple network clouds 130 via one or more proxies.

The end-user telecommunication devices 110 can include a variety of devices such as, telephones, cellular handsets, smartphones, tablets, personal data assistances, personal computers, two-way pagers, proprietary devices, and/or the like.

In the preferred embodiment, the telecommunication devices are used to gain communicative access to another device, either within or without the same telecommunications network. Communicative access is obtained by entering a destination address into the telecommunications device and transmitting a request for connection to the destination address to the telecommunications network. For instance, in a PSTN based embodiment, the telecommunication devices will typically be telephone units. Entering the destination address in this embodiment includes dialing the destination telephone number using the telephone unit. As the number is dialed, or after completion of dialing, signals are transmitted to the telecommunications network as a request to setup a connection to the destination number. In a cellular telephone system based embodiment, the destination number is transmitted as a connection request command to the mobile switching office. In an Internet based embodiment, the communicative access can be obtained by entering an IP address or URL into a browser application or by sending a VOIP connection request identifying the destination. In a messaging system embodiment, communication access is obtained by placing a destination address into, or otherwise providing the destination address, and transmitting the message to a message server. For example, in an email system embodiment, communication access is obtained by placing a destination address into the email and transmitting the email message to the email server. As yet another example, in a text, or short, message system embodiment, communication access is obtained by specifying a destination address for, e.g., placing the destination address into, the text message It will be appreciated, that these examples are provided only as non-limiting examples to help illustrate the general characteristics of the present invention.

Embodiments of the present invention operate to capture or gain access to the destination addresses that are submitted to gain access through the telecommunications 30 network. In accordance with one or more embodiments, such access may be provided using a secondary service comprising one or more secondary servers, or other server computing devices. The identity of the party or the source of the destination number is also obtained and stored into the database, e.g., database 150, by the lottery system 140 or other component or components, including a secondary service, along with the destination number. Thus, non-limiting examples of the destination addresses may include telephone numbers, portions of telephone numbers, message, such as email, text, short message and/or the like, addresses, mobile identification numbers, IP addresses, and/or the like.

It should also be appreciated that the entry sequences may only be based on a destination address. For instance, the destination address could be used as a seed to a random number generator. In addition, other information could be used as, or to generate, the entry sequence. For instance, the time of day and/or the date that a connection request is made may be used to generate an entry sequence. Furthermore, the simple action of making a connection request may simply be used to trigger the generation of a random number. Those skilled in the art will also appreciate that other techniques may be used. For instance, the timing between key presses of a user could be used as input to a random number generation. In addition, a user may be requested or prompted by the telecommunications system to enter a sequence using the keyboard. Another technique would be to take digital samples of any voice signals that may be detected on the communications line. These digital samples could be used to directly convert over to a random number or may be used as a seed to a random number generator. Thus, a variety of techniques may be used to generate the entry sequences and although one or more of the described techniques may in and of itself be considered a novel aspect of the present invention, the present invention is not to be limited to any particular technique.

The lottery system 140 collects the destination addresses (or entry sequences) from the telecommunications system 130. In accordance with one or more embodiments, the destination addresses, entry sequences, and/or the like may also be collected by the lottery system 140 via a secondary service, and/or one or more other components, including without limitation a data mining system, may receive and collect such data via the secondary service.

The lottery system 140 may collect the destination addresses for a finite period of time. For instance, the lottery may run daily, hourly, weekly, monthly, etc. Once the period of time is up, the collected destination addresses are used as the domain of lottery entries. In one embodiment, a winning sequence is randomly generated and then compared to the collected destination addresses. Depending on the similarity between the winning sequence and each collected destination address, an award may be granted. For instance, in one embodiment, only an exact match will result in generation of an award. In another embodiment, graduated awards may be presented based on the proximity of the match. For instance, one award may be provided for an exact match and a reduced award may be provided in all but one of the items in the sequence match the winning sequence. It will be appreciated to those skilled in the art that various payout tables can be generated to define the awards available through the various embodiments of the present invention and the present invention should not be limited to any particular payout construction.

In some embodiments, an awards processing system 160 may be used to provision the award system. Such a system can operate to automatically contact the winning participants or to automatically generate awards.

Figure 2:
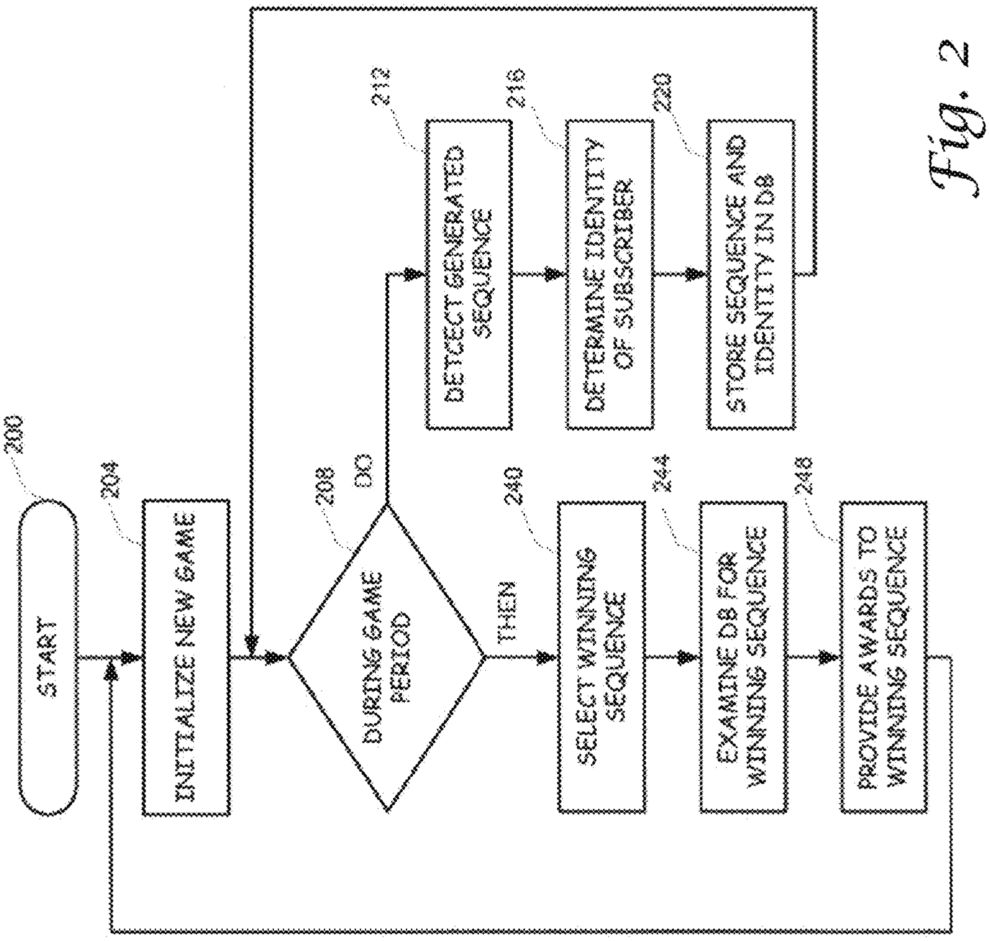
FIG. 2 is a flow diagram illustrating the steps involved in one embodiment of the present invention.

FIG. 2 is a flow diagram illustrating the steps involved in one embodiment of the present invention. The process 200 begins by the initialization of a new game. This process can include a variety of tasks, but in general, the tasks will at least include starting of a new period of time over which the lottery game will extend. Once the new game is initialized, the game begins. During the operational period of time for the lottery game 208, the process operates to detect when a sequence is generated 212. Once the sequence generation is detected, the identity that is associated with the generated sequence is identified 216. The generated sequence and the identity of the associated party are stored into memory 220. This process continues until the lottery game is over. Thus far, the duration of the lottery game has been described as being time based. However, those skilled in the art will appreciate that the duration of the lottery game may also be event based. For instance, the lottery game may continue until a certain number of entries are collected. Alternatively, the lottery game may generate a winning sequence at the onset and continue until the winning sequence is collected. Furthermore, the duration of the lottery may be tied to other events occurring the various embodiments of the invention my employ such defining events.

Once the duration of the lottery game is concluded, the process continues by selecting a winning sequence 240. It should be appreciated that the winning sequence can be selected at any time in this process but it is being portrayed as generated chronologically at this point simply as a non-limiting example. The winning sequence can be selected by generating a random number, or can be generated using some other means such as selecting a particular sequence from the domain of possible sequences. In addition, in some embodiments, the winning sequence may be selected directly from collected generated sequences—thereby guaranteeing a winner. However, in the illustrated embodiment, a winning sequence is selected and then compared to the stored generated sequences 244. Based on the results of this comparison, awards may be granted to the winning entries 248. Processing may then return to step 204 to initialize the beginning of another lottery game.

Figure 3:
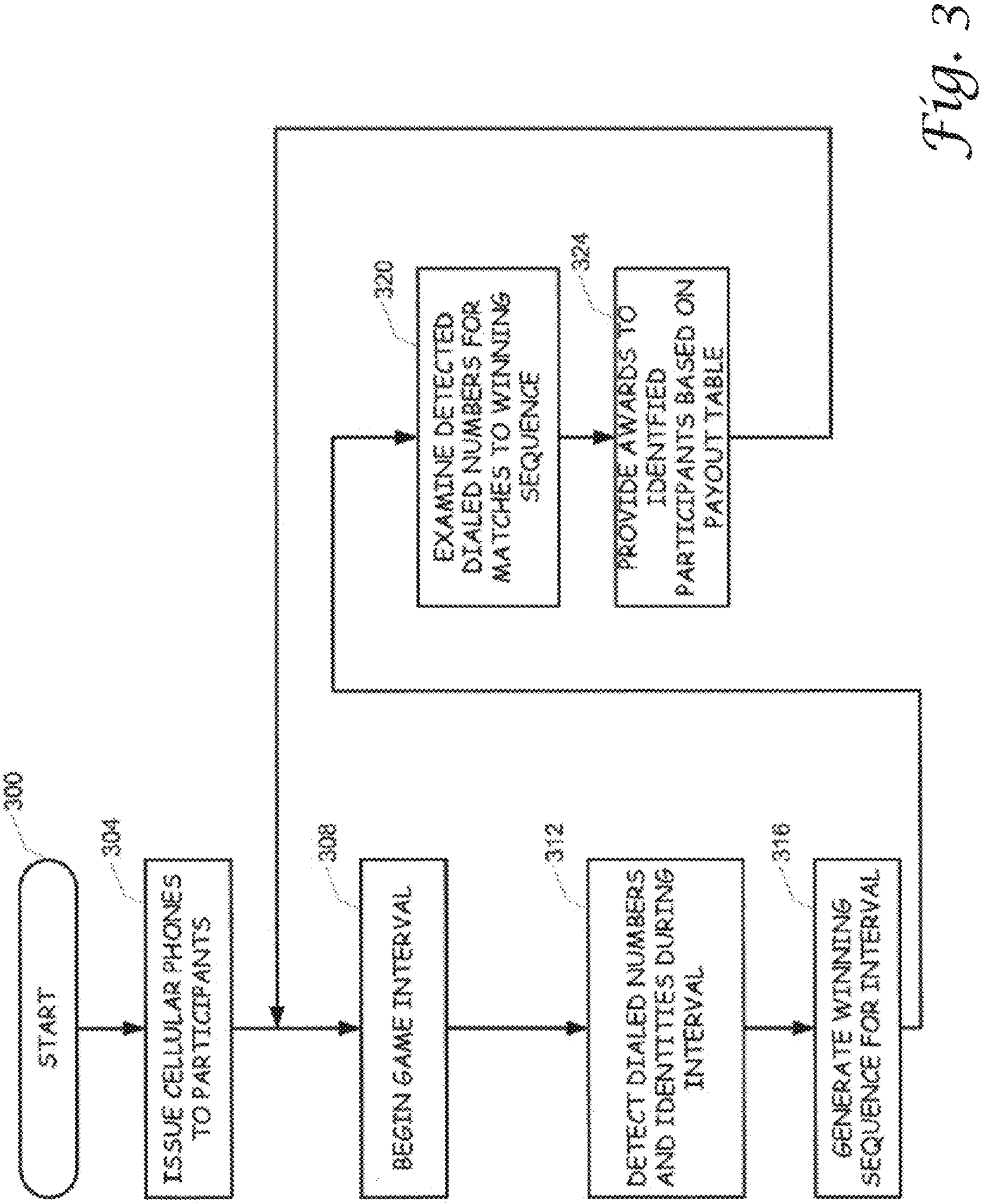
FIG. 3 is a flow diagram illustrating the steps involved in a cellular based embodiment of the present invention.

FIG. 3 is a flow diagram illustrating the steps involved in a cellular based embodiment of the present invention. The illustrated embodiment is a specific, non-limiting example of a particular embodiment of the present invention that can be used to limit churn and increase minute usage in a cellular system. It should be appreciated that although the illustrated embodiment may in and of itself be novel, the present invention is not necessarily limited to this particular embodiment.

The process 300 begins by a cellular service provider provisioning one or more subscribers with cellular telephones to be used on the provider's cellular system 304. This process may include running a special for new subscribers, or can be offered to existing subscribers or a combination of both. In either case, particular cellular subscribers are identified as being participants in the lottery event. Once the participants are identified and provisioned, the game interval commences 308. During the active period of the game, numbers that are dialed by the participating subscribers using the cellular system are detected and maintained along with the identity of the subscriber 312. In accordance with one or more embodiments, the numbers may be detected using one or more proxies. A winning sequence for the particular gaming interval is also generated 316. Once the gaming interval is over, the dialed numbers are examined and compared to the winning sequence to determine if there are any winners (i.e., matching sequences) 320. If a dialed number qualifies for an award based on a comparison with the winning sequence, the award is provided to the subscriber associated with the dialed number 324. In accordance with one or more embodiments, an award may be provided using one or more proxies. The process can then continue at step 308 with a new gaming interval. Alternatively, the process can continue at step 304 to allow additions or deletions of the pool of participants. In another embodiment, processing can continue at step 316 to generate another winning sequence. In this embodiment, multiple winners can be identified or, if there were no winners using the first winning sequence, a new winning sequence can be generated. This process can be repeated until a winner is identified.

More specifically, the illustrated embodiment can operate to capture every telephone call made by a participant and automatically enter the 7 digits (or 10 digits) that were dialed into the lottery drawing. The drawing takes place periodically, such as once every night or some other frequency (or even instantly). The outcome of the drawing will be determined based on the telephone call or telephone calls made between each drawing. Similar to other lotteries and/or sweepstakes, prizes are paid against a given pay table. Thus, if you hit 3 of the 7 digits you win $X, 4 of the 7 digits $Y and 7 of the 7 digits award the jackpot.

Throughout the present description, the term "entered sequence" and "winning sequence" has been used. It should be appreciated that these sequences can take on a variety of forms. In one embodiment, the sequences can simply be a 7 or 10 digit telephone number. However, it should be appreciated that this is a non-limiting example and the sequence can simply be a single value, an integer, a value generated through an analog to digital conversion, an output of a random number generated, a series of characters, a series of glyphs, etc. It should be appreciated that a glyph is defined as any symbol or character, whether it is a letter, number, punctuation mark, graphic or other displayable element. By way of some further non-limiting examples, a sequence may comprise a messaging address, such as an email address, text message address, a short message address and/or the like.

It should also be appreciated that the present invention can be incorporated into other types of systems that are not typically considered telecommunications systems. For instance, the present system could be employed in a point-of-sale environment. In such an embodiment, each time a receipt is issued to a customer (i.e., whenever a customer makes a purchase) an entry sequence can be generated either randomly, based on the invoice or receipt number of any of a variety of other information. These entry sequences can then be entered into the lottery game. Similarly, the present invention can be incorporated into an online transaction, such as EBAY or ITUNES. In such an embodiment, when a transaction is conducted (i.e. winning a bid on EBAY or downloading a song from ITUNES), a sequence can be entered or generated and entered into the lottery game for the next drawing. Similarly, the present invention could be used in information based Internet services such as mapping services, weather services, news services, etc. Each time a user accesses a particular web site, and entry for the lottery may be generated. Likewise, each time the user actuates and application available on a website, such as generating driving directions on MAPQUEST, an entry in the lottery may be generated. In accordance with one or more embodiments, an entry sequence may be entered into the lottery game using one or more proxies.

It will be appreciated that the generic environment can represent a variety of specific environments and one or more networks, which may be comprised of telecom network 130, such network(s) including without limitation, a public switched telephone network (PSTN), a cellular telephone network, a voice over IP (VOIP) network, a data network, wide area network (WAN), local area network (LAN), the Internet, a message-centric, an email-centric network, and/or the like, and any network protocol(s) used on such network(s). Further, it will be appreciated that the telecommunications network cloud 130 may represent a combination of two or more similar and very different network types. For instance, the lottery system 140 may interface to the PSTN infrastructure, a cellular infrastructure and a VOIP infrastructure. Thus, the telecommunication cloud 130 may represent multiple infrastructures or the lottery system 140 may be connected to multiple network clouds 130.

The end-user telecommunication devices 110 can include a variety of devices such as, telephones, cellular handsets, personal data assistances, personal computers, two-way pagers, proprietary devices, and/or the like.

In the preferred embodiment, the telecommunication devices are used to gain communicative access to another device, either within or without the same telecommunications network. Communicative access is obtained by entering a destination address into the telecommunications device and transmitting a request for connection to the destination address to the telecommunications network. For instance, in a PSTN based embodiment, the telecommunication devices will typically be telephone units. Entering the destination address in this embodiment includes dialing the destination telephone number using the telephone unit. As the number is dialed, or after completion of dialing, signals are transmitted to the telecommunications network as a request to setup a connection to the destination number. In a cellular telephone system based embodiment, the destination number is transmitted as a connection request command to the mobile switching office. In an Internet based embodiment, the communicative access can be obtained by entering an IP address or URL into a browser application or by sending a VOIP connection request identifying the destination. In a messaging system embodiment, communication access is obtained by placing a destination address into, or otherwise providing the destination address, and transmitting the message to a message server. For example, in an email system embodiment, communication access is obtained by placing a destination address into the email and transmitting the email message to the email server. As yet another example, in a text, or short, message system embodiment, communication access is obtained by specifying a destination address for, e.g., placing the destination address into, the text message It will be appreciated, that these examples are provided only as non-limiting examples to help illustrate the general characteristics of the present invention.

Embodiments of the present invention operate to capture or gain access to the destination addresses that are submitted to gain access through the telecommunications network. The identity of the party or the source of the destination number is also obtained and stored into the database, e.g., database 150, by the lottery system 140, or other component, along with the destination number. Thus, non-limiting examples of the destination addresses may include telephone numbers, portions of telephone numbers, email addresses, mobile identification numbers, IP addresses, and/or the like. It should also be appreciated that the entry sequences may only be based on a destination address. For instance, the destination address could be used as a seed to a random number generator. In addition, other information could be used as, or to generate, the entry sequence. For instance, the time of day and/or the date that a connection request is made may be used to generate an entry sequence. Furthermore, the simple action of making a connection request may simply be used to trigger the generation of a random number. Those skilled in the art will also appreciate that other techniques may be used. For instance, the timing between key presses of a user could be used as input to a random number generation. In addition, a user may be requested or prompted by the telecommunications system to enter a sequence using the keyboard. Another technique would be to take digital samples of any voice signals that may be detected on the communications line. These digital samples could be used to directly convert over to a random number or may be used as a seed to a random number generator. Thus, a variety of techniques may be used to generate the entry sequences and although one or more of the described techniques may in and of itself be considered a novel aspect of the present invention, the present invention is not to be limited to any particular technique.

The lottery system 140 collects the destination addresses (or entry sequences) from the telecommunications system 130, or from a secondary service, for a finite period of time. For instance, the lottery may run daily, hourly, weekly, monthly, etc. Once the period of time is up, the collected destination addresses are used as the domain of lottery entries. In one embodiment, a winning sequence is randomly generated and then compared to the collected destination addresses. Depending on the similarity between the winning sequence and each collected destination address, an award may be granted. For instance, in one embodiment, only an exact match will result in generation of an award. In another embodiment, graduated awards may be presented based on the proximity of the match. For instance, one award may be provided for an exact match and a reduced award may be provided in all but one of the items in the sequence match the winning sequence. It will be appreciated to those skilled in the art that various payout tables can be generated to define the awards available through the various embodiments of the present invention and the present invention should not be limited to any particular payout construction.

In some embodiments, an awards processing system 160 may be used to provision the award system. Such a system can operate to automatically contact the winning participants or to automatically generate awards.

In accordance with one or more embodiments, lottery system 140 may communicate with a subscriber and/or a subscriber's telecommunications server via one or more proxies, which may act as a secondary service. Such a secondary, or secondary, service may receive a subscriber's action, e.g. entry sequence, which action is directed to a telecommunications system, or service, or other systems/service. The secondary service may notify the lottery system 140, or other system or component, of the subscriber's action and forward the subscriber's action to telecommunication system and at least one other system, such as the lottery system 140, referred to as a second system, second service. Other examples of such second system, or service, are discussed in more detail below. For purposes of simplicity, while the following discussion may refer to a telecommunications system, it should be apparent that any other system may be used in place of a telecommunications system. In other words, a telecommunications system may be one example of a first service, and other first services such as an online casino gaming service may also be used in connection with one or more embodiments of the present invention.

Figure 4:
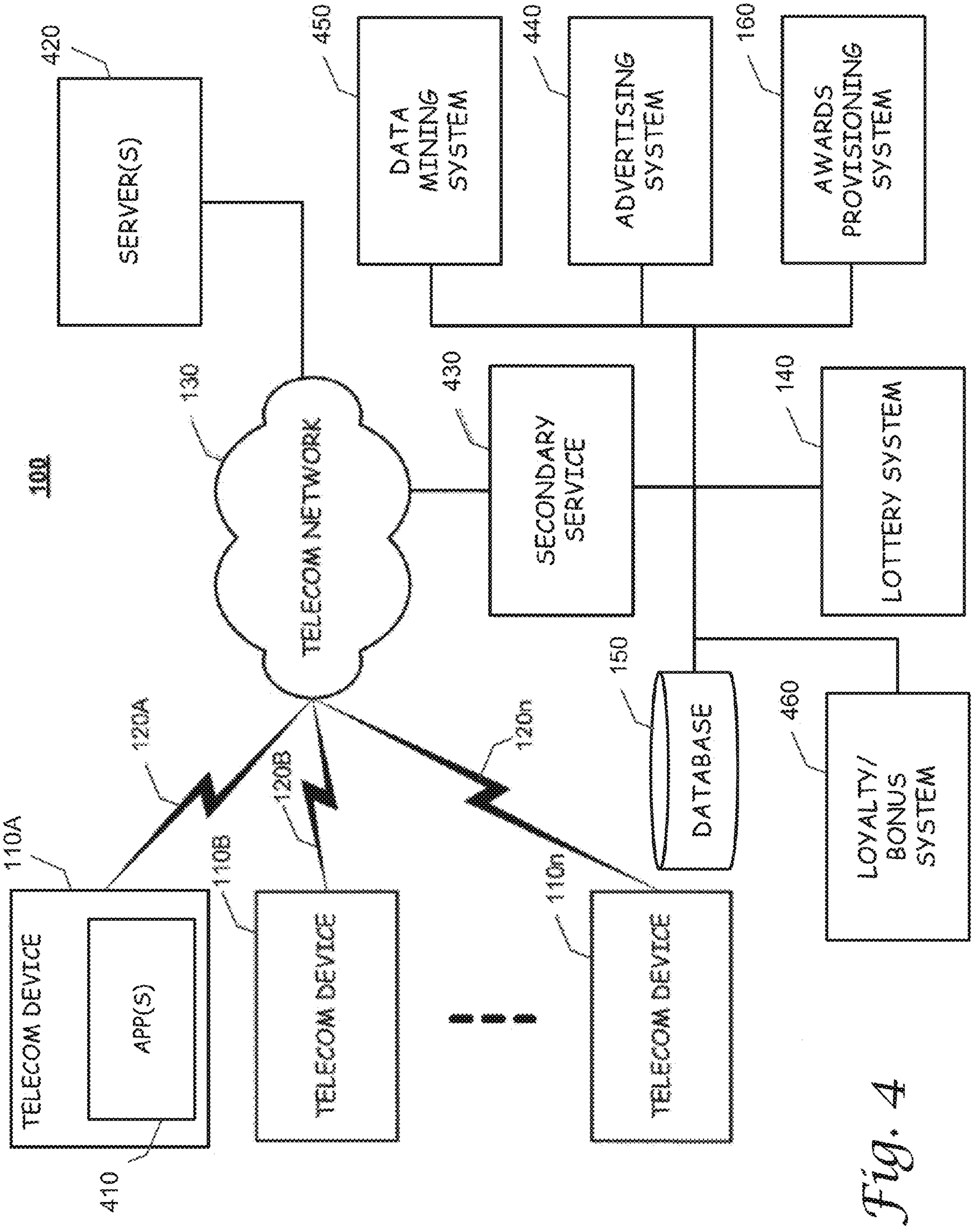
FIG. 4 provides an example of a system diagram illustrating components for use in accordance with embodiments of the present invention.

FIG. 4 provides an example of a system diagram illustrating components for use in accordance with embodiments of the present invention. In the example of FIG. 4, one or more end-user devices 110A-110*n* may be communicatively coupled to the telecommunications network infrastructure 130 through communication channels or media 120A-120*n*. A lottery system, such as lottery system 140, may also be coupled to the telecommunications network infrastructure. In the example, the lottery system 140 may be coupled to the telecommunications network 130 via secondary service 430. As is also shown in the example, the lottery system 140 may be coupled to a database 150 or other memory system or device for providing data storage and optionally an awards provisioning system 160.

Secondary service 430 may comprise one or more server computing devices, or server computers. In accordance with one or more embodiments, one or more applications, or apps 410, that reside on a user's computing device, such as telecom device 110A, may be subscribed to the lottery system 140 so that the user may obtain access to one or more collateral services via the secondary service 430. An app 410 may be used in connection with a first, or primary, service provided by one or more of application server(s), or server(s), 420. In accordance with one or more embodiments, an action, e.g., user input, generated using an app 410 may be received by the secondary service 430, which forwards the user input to the one or more application servers 420 that provide the first, or primary, service(s) and forwards at least a portion of the user input to at least one second server providing at least one second service, which is different from the first service.

An app 410 may comprise any application executing on the device 110A. By way of some non-limiting examples, app(s) 410 may comprise one or more social networking client apps for such social networking sites as Facebook™, Twitter™, Instagram™, Spotify™, Snapchat™ LinkedIn™, Vine™, FaceTime™, Skype™, and/or other client apps, such as phone, email messaging, text messaging, short messaging, web browsing, blog posting, media player, online casino gaming, mapping, media reader, investing, and/or the like apps, and server(s) 420 may comprise one or more servers servicing such apps, e.g., providing a first service. It should be apparent that the previous examples are not intended to be limiting, and that any application or first service now known or later developed may be used in connection with one or more embodiments of the present invention.

Secondary service 430 may provide one or more of the lottery system 140, data mining system 450, advertising system 440, awards provisioning system 160, loyalty and bonus system 460 with access to communications between app(s) 410 and server(s) 420, or information associated with such communications.

By way of a non-limiting example, a communication may comprise user input comprising an entry sequence, which may be used in generating an entry into a lottery game, or games. The secondary service 430 may provide the lottery system 140 with access to a communication from the app 410 to the server 420 and/or with access to a communication from the server 420 directed to the app 410. Such communication(s) may also be provided to other components, such as the data mining system 450, for mining data about the user.

By way of a further non-limiting example, such communication from the server 420 may be provided to advertising system 440, which may append, or otherwise add, one or more advertisements to the communication, which communication and advertisement(s) may then be forwarded to the app 410 by the secondary service 430. Such advertisement(s) might be displayed at device 110A in connection with a display of information from the communication provided by server 420. The advertisement(s) may comprise one or more general ads and/or one or more ads personalized to the user. A personalized ad may comprise an ad that is selected using information known about the user, which information may be obtained, e.g., by data mining system 450, from the communication(s) accessible via the secondary service 430, or from any other information source(s). It should be apparent that any system now known or later developed for personalizing advertisements may be used in connection with embodiments of the present invention.

In at least one embodiment, the data mining system 450 coupled to the secondary service 430 may be used to collect data, including data about the user(s) subscribing to the secondary service 430 and/or the lottery system 140 and/or other persons, entities, etc. Such data may be used, for example, by the advertising system 440 to identify one or more advertisements, by the awards provisioning system 160 to identify awards personalized for the user(s), by the lottery system 140 to create one or more lottery games personalized for the user(s), one or more loyalty and/or bonus features personalized for the user, etc.

Figure 5:
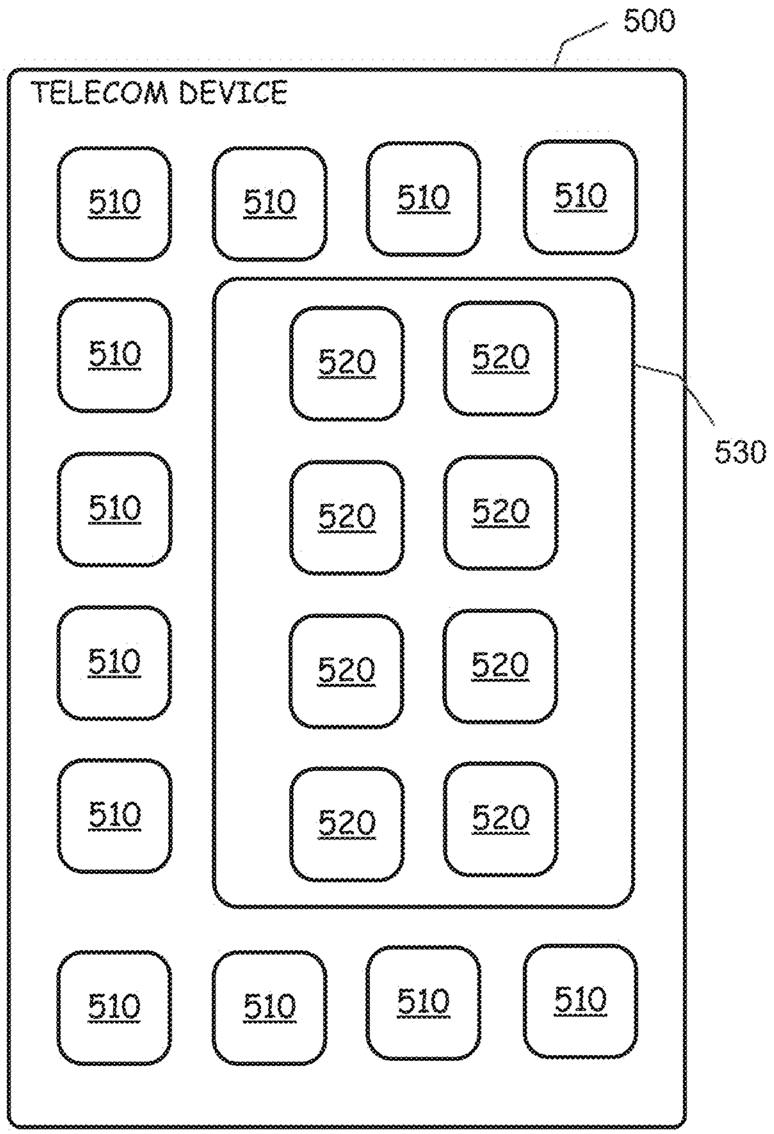
FIG. 5 provides an example of a user computing device with applications, or apps, including a secondary app in accordance with one or more embodiments of the present invention.

In accordance with one or more embodiments, app(s) 410 comprises at least one secondary app, which is communicatively coupled with secondary service 430, e.g., via telecom network 130, or any other network, which may include the Internet. FIG. 5 provides an example of a user computing device with applications, or apps, including a secondary app in accordance with one or more embodiments of the present invention. In the example of FIG. 5, device 500, which may be device 110A, has a number of apps, which include apps 510, 520 and 530. For the sake of simplicity, the apps are shown as icons that might appear on a device's display. It should be apparent that each icon has corresponding application program code, which implements functionality of the particular app. App 530 comprises a secondary app, which may be used by the user to subscribe to the secondary service 430 and one or more of the lottery system 140, advertising system 440, data mining system 450, loyalty/bonus secondary service 460 and/or the like; and apps 520 comprise one or more apps that the user has identified for use with one or more such systems.

By way of a non-limiting example, a user might identify an app 510 to be added, or associated with, secondary app 530 by selecting the app's 510 icon and dragging at least a portion of the icon inside at least one display boundary of the secondary app 530. By way of a further non-limiting example, the secondary app's 530 icon may have an initial size similar to that of the other icons, and the size of the secondary app's 530 icon may expand when the user selects the secondary app 530, the user drags at least a portion of another app's icon onto the secondary app's 530 icon, and/or the like. Similarly, the user may remove and app 520 by selecting the app's 520 icon and dragging at least a portion of the icon outside the secondary app's 530 icon boundaries.

Although eight apps 520 are shown within the secondary app's 530 icon in the example of FIG. 5, any number of apps may associated with the secondary app 530. Scrolling functionality may be provided to allow the user to scroll and view the various apps 520 associated with the secondary app 530.

In accordance with one or more embodiments, secondary service 430 may be notified of any activity or usage of an app 520, and such notification may trigger one or more collateral services, e.g., one or more of lottery system 140, awards/provisioning system 160, advertising system 440, data mining system 450, loyalty and bonus system 460, and/or the like. By way of some non-limiting examples, secondary service 430 may be notified and one or more collateral services may be triggered, such as generating a lotto entry by lottery system 140, in response to a user opening a client app 520, such as opening a Facebook™, Twitter™, Instagram™, etc. app 520, on the client device 110A, or device 500, posting content, such as a picture, a message, an annotation, etc., using a client app 520, submitting a friend, follow, like, share, etc. request using a client app 520, and/or the like.

Figure 6A:
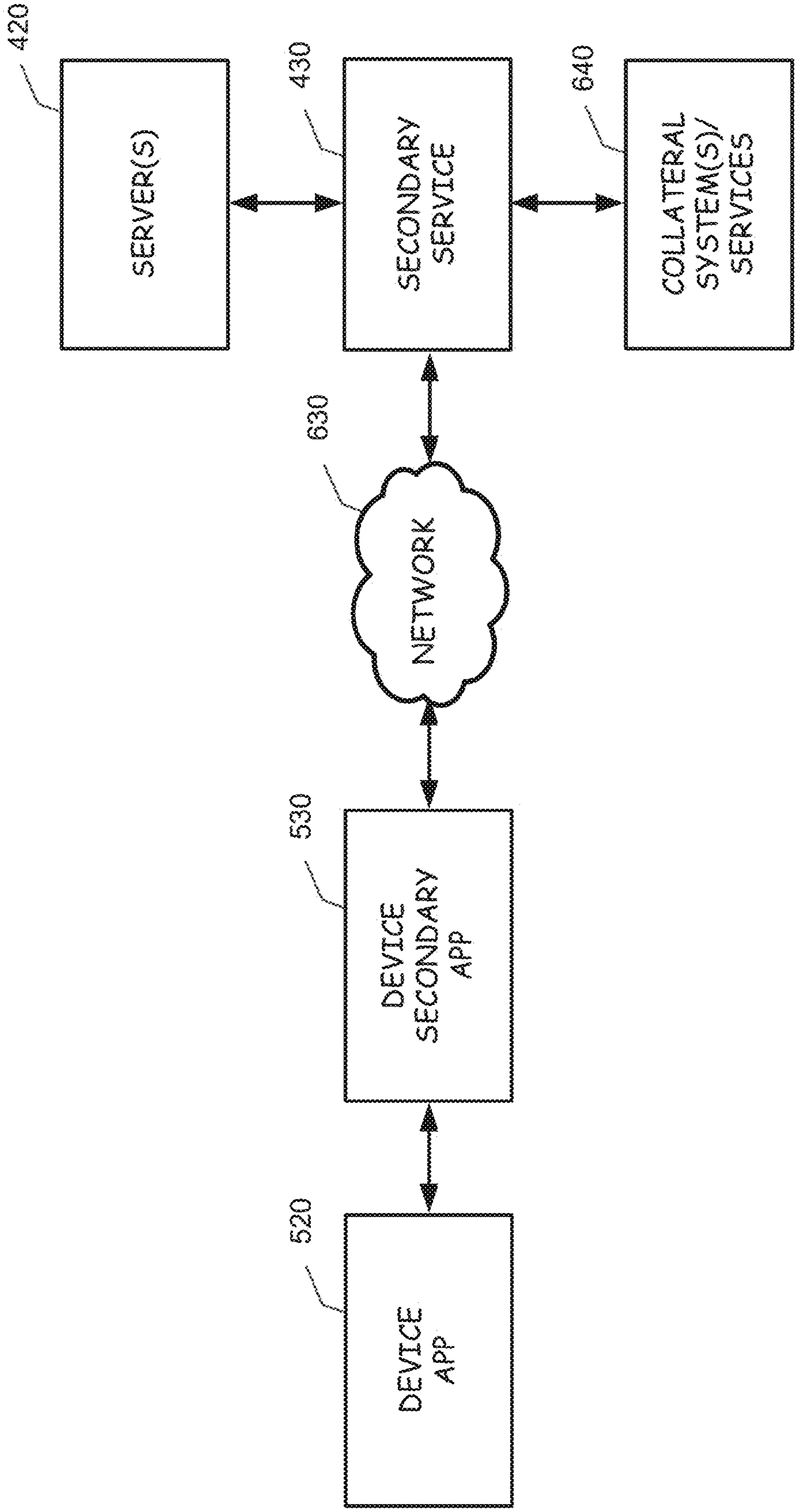
FIGS. 6A and 6B provide illustrative overviews of communication flow in accordance with one or more embodiments of the present invention.
Figure 6B:
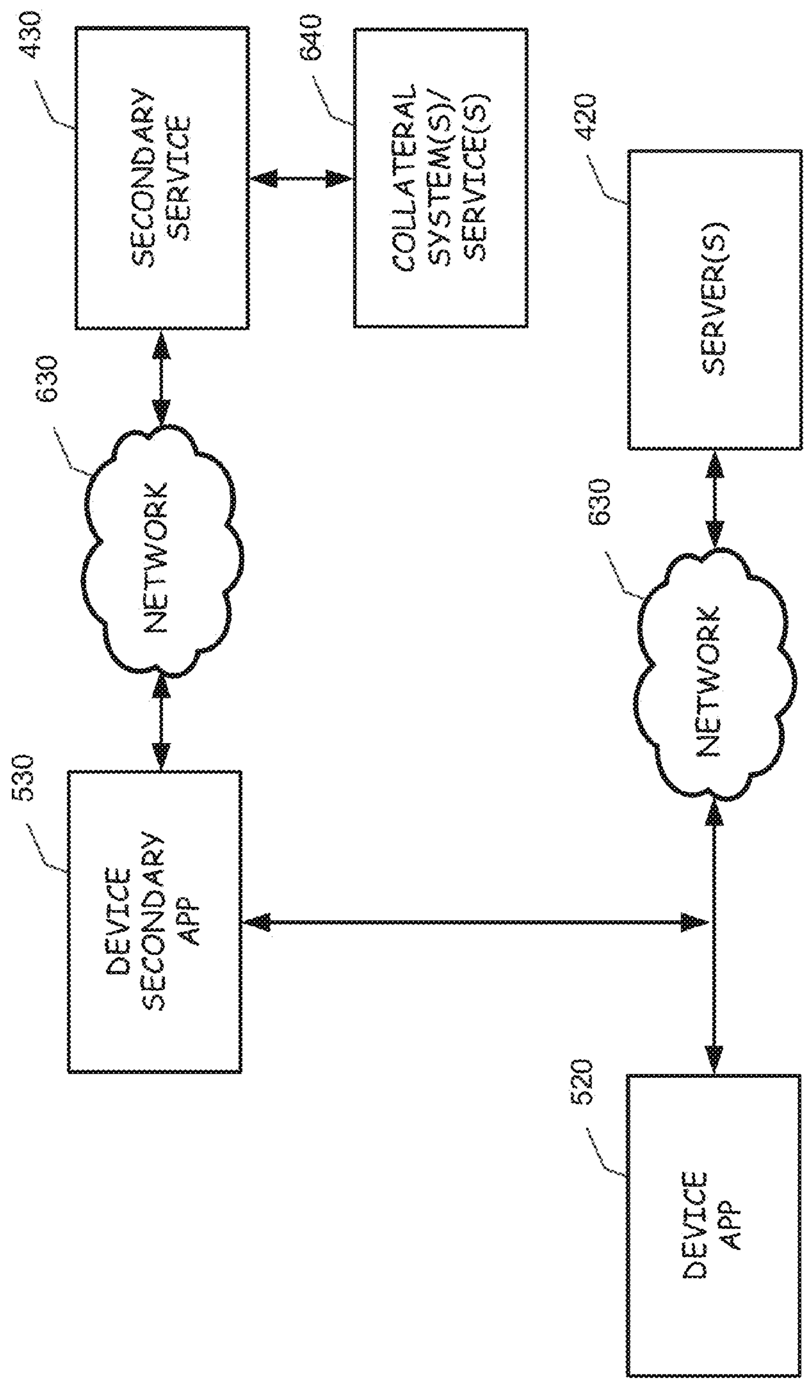

In response to receiving such notification from the secondary app 530, the secondary service 430 may notify one or more collateral systems, or services, such as and without limitation systems 140, 160, 440, 450 and 460, of the activity, or action. In accordance with one or more embodiments, the secondary service 430 may be configured to forward a communication received by the secondary service 430, e.g., a request to open a Facebook™ page, to one or more of the servers 420 providing a primary service, e.g., a Facebook™ server, in connection with the app 520. The secondary service 430 may direct a communication from the server(s) 420 to an app 520 using secondary app 530, and may also direct, or otherwise forward, the communication from the server(s) 420 to one or more collateral systems, or services. Alternatively, each device app 520 may communicate with the one or more servers 420 providing the primary service for the app 520, and the secondary service 430 may operate to monitor, using secondary app 530, to detect activity or action in connection with each of the one or more app(s) 520. FIGS. 6A and 6B provide an illustrative overview of communication flows in accordance with one or more embodiments of the present invention.

In the example shown in FIG. 6A, an action, or activity, such as a request or other communication from device app 520, which may be directed to the servers(s) 420 or to one or more recipients via the server(s) 420, is routed to device secondary app 530 at the device 110, or device 500. The device secondary app 530 may transmit the action/activity to secondary service 430 via network 630, or other network. By way of a non-limiting example, secondary app 530 may transmit the action/activity to the secondary service 430 using an address, such as a universal resource locator (URL) or other address, of the secondary service 430. The secondary service 430 may direct the action/activity to one or more collateral system(s), or service(s), 640, which may be one or more of the systems 140, 160, 440, 450 and 460, for example. In addition, the secondary service 430 may direct the action/activity to the server(s) 420 using addressing information associated with the action/activity generated using the device app 520. By way of a non-limiting example, one or both of the secondary app 530 and the secondary service 430 may modify, or otherwise include, an address that directs any return, or reply, communication transmitted by the server(s) 420 to the secondary service 430. At least one of the communication, the secondary service 430 and the secondary app 530 may store information identifying one or both of the device 110/500 and the device app 520, which information may be used to direct a response, or other communication, received by the secondary service 430 from the server(s) 420 to the device app 520 at the device 110/500.

Referring to FIG. 4, by using the address of the secondary service 430 as the return address in a communication routed to the server(s) 420, a response, or other subsequent communication, may be directed to the secondary service 430 on behalf of the device app 520. The secondary service 430 may direct the subsequent communication to one or more of the systems 140, 160, 440, 450 and 460. In addition, the secondary service 430 may direct the subsequent communication to the secondary app 530 for forwarding to the device app 520.

FIG. 6B illustrates another configuration of the invention. In the example provided in FIG. 6B, secondary app 530 is resident on a client device, such as device 110A or device 500, listens, or monitors, to detect any activity or action involving the device app 520. If an activity, or action, in a device app 520 is detected by secondary app 530, secondary app 530 may scrape, or retrieve, information about the activity, or action, and forward such information to secondary service 430 via network 630, which may forward such information to one or more collateral systems 640 to trigger one or more collateral services.

In the example of FIG. 6B, secondary app 530 may monitor any network communication between the device app 520 and the one or more server(s) 420 providing the primary service, and retrieve some or all of the information from such a communication. In the example, secondary app 530 might retrieve information from device app 520 in addition to or instead of the information being transmitted between the device app 520 and the server(s) 420 via network 630. Additionally, one or more collateral systems, or services, 640 may communicate information to the device app 520 and/or the server(s) 420, which transmission may be performed using network 630.

Device app 520 may be a social media service app, and communication network 630 may be used to transmit any interaction between members of an associated social media network, which network may be maintained by a social media service. In other words, a social media service, such as Facebook™, Twitter™, Instagram™, Spotify™, LinkedIn™, etc. may have a corresponding social media network comprising members of the social media service and relationships between members. An action or activity may involve one or more members of a social media network. A social media network member may use a social media app 520, such as Facebook™, Twitter™, Instagram™, etc. client app, to communicate with one or more other members of the social media network, or to communicate with, e.g., make a request of, the social media service, using network 630.

In accordance with one or more embodiments, app(s) 410 may be one or more online casino gaming app(s), each of which may be provided by a different online gaming entity.

When the one or more online casino gaming app(s) are associated with the secondary app 530, the secondary app 530 and secondary service 430 may provide access to a loyalty and/or bonus system 460. System 460 may provide a loyalty club rewards, or awards, program and/or bonus features regardless of the online gaming entity(ies) providing the one or more online casino gaming app(s 410). By way of a non-limiting example, a bonus may be determined based on a user's online gaming activity, e.g., play, game outcome and/or the like, in connection with one, or multiple ones, of the online casino gaming app(s) 410, which bonus may be provided without regard to the online gaming entity providing the online casino gaming app(s) 410. By way of a further non-limiting example, a loyalty rewards program may be based on usage of one, or multiple ones, of the online casino gaming app(s) 410, which loyalty rewards program may be provided without regard to which online gaming entity providing the online casino gaming app(s) 410. Thus, a user may sign up with a single loyalty club to earn points, and obtain loyalty rewards, based on the user's use of any online gaming entity's, or entities', online gaming system(s). Similarly, a user may receive bonus rewards based on the user's use of any online gaming entity's, or entities', online gaming system(s).

Figure 7:
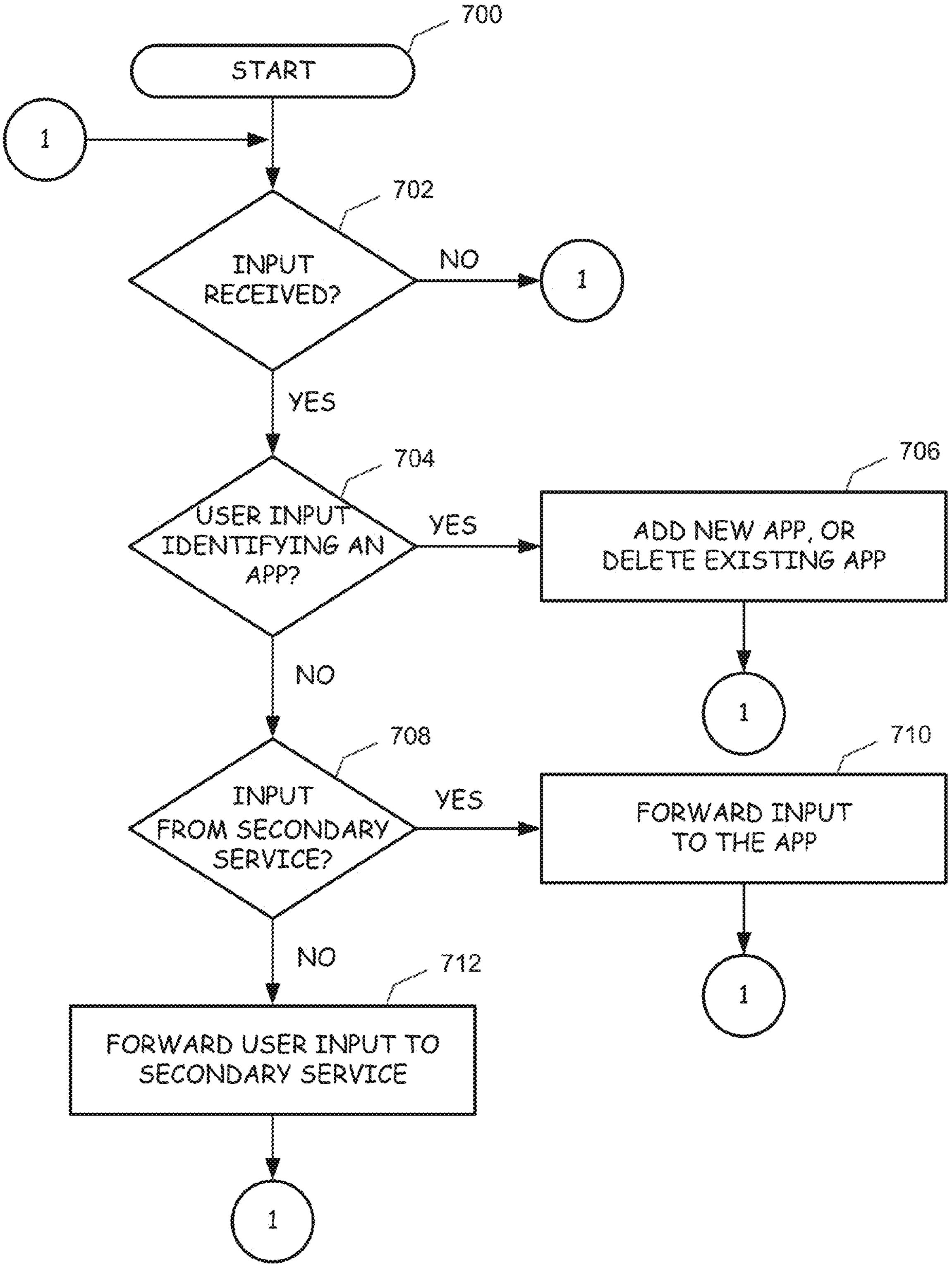
FIG. 7 provides a secondary app process flow that may be used in accordance with one or more embodiments of the present invention.

FIG. 7 provides a secondary app process flow that may be used in accordance with one or more embodiments of the present invention. The process flow illustrated in the example of FIG. 7 may be performed by a secondary app, such as a secondary app 530, operating on device 110, for example. The process flow starts at step 700, and at step 702, a determination is made whether input is received by the secondary app 530. If not, processing awaits such input. By way of a non-limiting example, input might comprise user input representing an action taken by the user using an app 520 in connection with a first service provided by a system such as telecommunications system, an online casino gaming system, and/or the like. The user input may be received via an app 520, which is registered, or otherwise associated with, the secondary app 530 and/or the secondary service 430. The user might associate the app 520 with the secondary app 530 and secondary service 430 so that the user input generated by the app 520 is transmitted to the secondary service 430, which may forward the user input to the server(s) 420, which provides a first service, associated with the app 520 and may forward some or all of the user input to one or more of one or more of the systems 140, 160, 440, 450 and 460, which may provide one or more second services. As discussed herein, the user might associate the app 520 with the secondary service 430 by dragging at least a portion of the app within a boundary of the secondary app 530. Such user activity may also be considered to be input, which may be received and forwarded by the secondary app 530 to the secondary service 430.

If a determination is made, at step 702, that input is received, processing continues at step 704. At step 704, a determination is made whether or not the input comprises user input to subscribe an app to, or unsubscribe an app from, the secondary app 530, the secondary service 430 and/or one or more of one or more of the systems 140, 160, 440, 450 and 460.

In accordance with one or more embodiments, the secondary app 520 and/or the secondary service 430 may maintain a list of the app(s) 520 that are subscribed, and may optionally maintain a mapping between each app 520 and the one or more of one or more of the systems 140, 160, 440, 450 and 460 that is/are to receiver user input received from the app 520 via the secondary app 530. The type of app 520 may indicate which of the one or more of one or more of the systems 140, 160, 440, 450 and 460 are to receive user input from the app 520. By way of some non-limiting examples, user input from an app 520 that is an online casino gaming app might be at least forwarded to the loyalty and bonus system 460, and user input from a telecommunications or messaging app might at least be forwarded to the lottery system 140. Alternatively, the user might be given an option to specify which of the systems 140, 160, 440, 450 and 460 are to receive user input from the app 520.

If it is determined, at step 704, that the user input is input to subscribe or unsubscribe an app, from the secondary app 530, the secondary service 430 and/or one or more of one or more of the systems 140, 160, 440, 450 and 460, processing continues at step 706 to add the new app 510, in a case of a subscription, or to delete an existing app 520, in a case that the app is to be unsubscribed. Processing continues at step 702 to process any further input received by the secondary app 530.

If it is determined, at step 704, that the received input is other than input to subscribe or unsubscribe an app, processing continues at step 708 to make a determination whether to forward the input to an app 520 or to the secondary service 430. More particularly and where the input is received from the secondary service 430, a determination is made at step 708 to forward the input to the appropriate app, e.g., the app 520 identified by the input or by information provided by the secondary service 430 and/or information maintained by the secondary app 530. The input may comprise a response to a communication originating from the app 520 and forwarded to server(s) 420, and the input, or response, may be received by, and forwarded by, the secondary service 430 to the secondary app 530. The input may comprise input received by the secondary service 430 from one or more of the servers 420. The input may comprise input received by the secondary service 430 from one or more of one or more of the systems 140, 160, 440, 450 and 460 and forwarded to the secondary app 530 by the secondary service 430. Such input from one or more of one or more of the systems 140, 160, 440, 450 and 460 may comprise one or more advertisements identified by advertisement system 440, information about an award from system 160 and/or system 460, and/or the like. Processing continues at step 702 to process any further input.

If it is determined, at step 708, that the input comprises user input from the app 520, processing continues at step 712, and the secondary app 530 forwards the user input to the secondary service 430. Processing continues at step 702 to process any further input.

Figure 8:
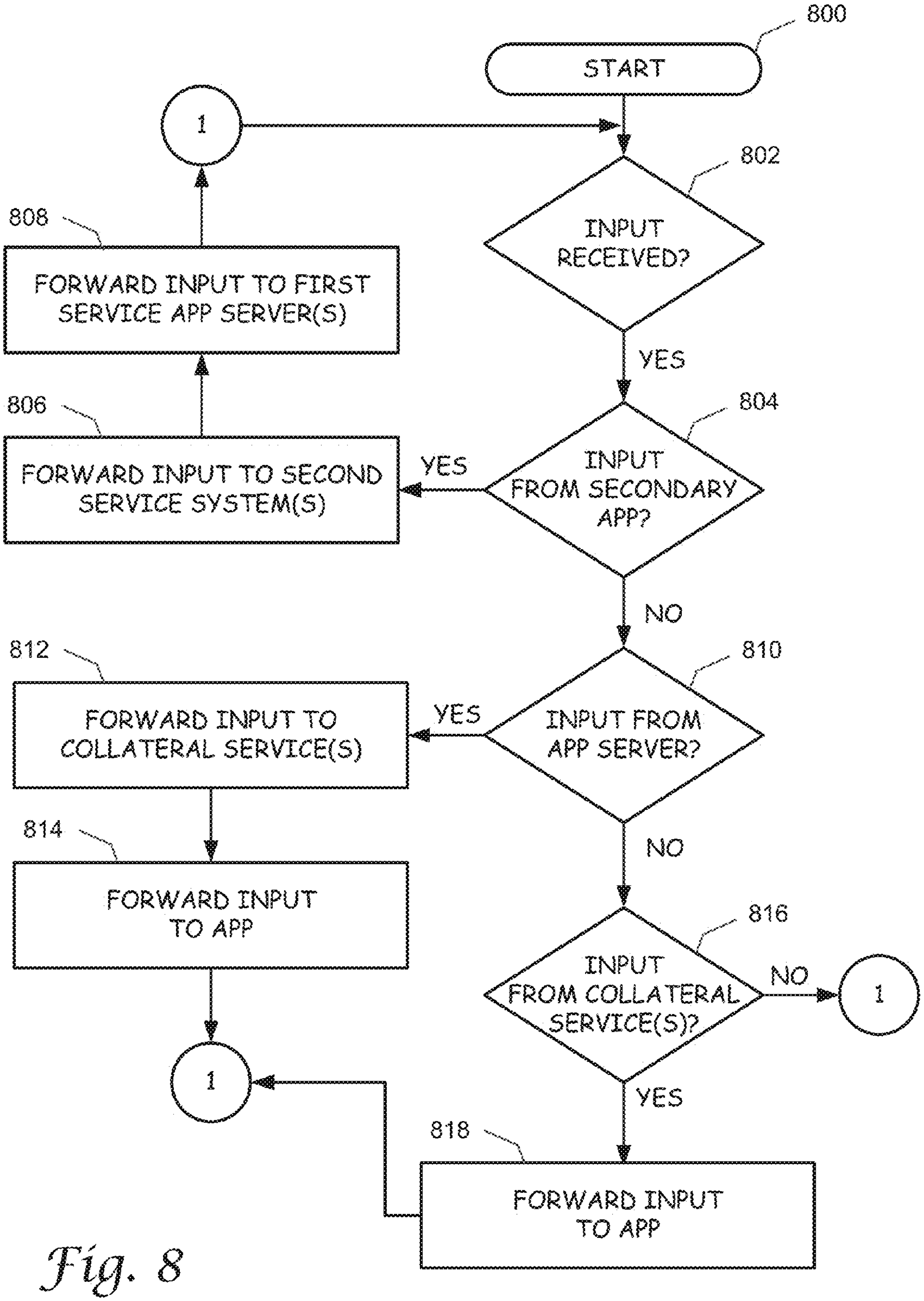
FIG. 8 provides a secondary service process flow that may be used in accordance with one or more embodiments of the present invention.

FIG. 8 provides a secondary service process flow that may be used in accordance with one or more embodiments of the present invention. The process flow illustrated in the example of FIG. 8 may be performed by a secondary service, such as secondary service 430, for example. At step 802, a determination is made whether or not input is received. By way of a non-limiting example, such input might be received from secondary app 530, one or more of the server(s) 420, and/or one or more of the systems 140, 160, 440, 450 and 460.

If a determination is made, at step 802, that input was received by the secondary service 430, processing continues at step 804 to make a determination whether or not the input was received from secondary app 530. Such input might be an entry sequence forwarded at step 706 of FIG. 7, for example. If it is determined, at step 804, that the input is from the secondary app 530, processing continues at step 806 to forward the input to one or more of the systems 140,

160, 440, 450 and 460 to provide at least one second service and to the appropriate one or more server(s) 420 that are to provide the first service associated with the app 520. Processing continues at step 802 to await any further input.

Is it is determined, at step 804, that the input comprises input other than input from secondary app 530, processing continues at step 810 to make a determination whether or not the input received by the secondary service 430 is from the server(s) 420. If so, processing continues at step 812 to forward the input to one or more of the systems 140, 160, 440, 450 and 460 providing the at one second service. Processing continues at step 802 to await any further input.

By way of a non-limiting example, such further input might be from any one or more of the systems 140, 160, 440, 450 and 460 in response to the input received by the secondary service 430, e.g., from the secondary app 530, and/or from the server(s) 420, and forwarded to one or more of the systems 140, 160, 440, 450 and 460 by the secondary service 430. By way of some non-limiting further examples, the response might be, for example and without limitation, one or more advertisements from advertising system 440, one or more awards from awards provisioning system 160, loyalty and/or bonus features from the loyalty/bonus system 460, which might be incorporate into a communication to be forwarded to the device 110, or 500, by the secondary service 430.

If a determination is made, at step 810, that the input is not received from the server(s) 420, processing continues, at step 816, to make a determination whether or not the input is received from one or more of the systems 140, 160, 440, 450 and 460. If not, processing continues at step 802 to await further input. If so, processing continues, at step 818 to forward the input to the app 520, via the secondary app 530 and the secondary service 430. Processing continues at step 802 to await any further input.

The process flow shown in FIG. 8 might be used in connection with the communication flow shown in FIG. 6A. The process flow of FIG. 8 may be modified for use with the communication flow shown in FIG. 6B. For example, steps 808 and 814 may be omitted, since the communication between the app 520 and the server(s) 420 may occur without passing through the secondary app 530 in the example communication flow shown in FIG. 6B.

Figure 9:
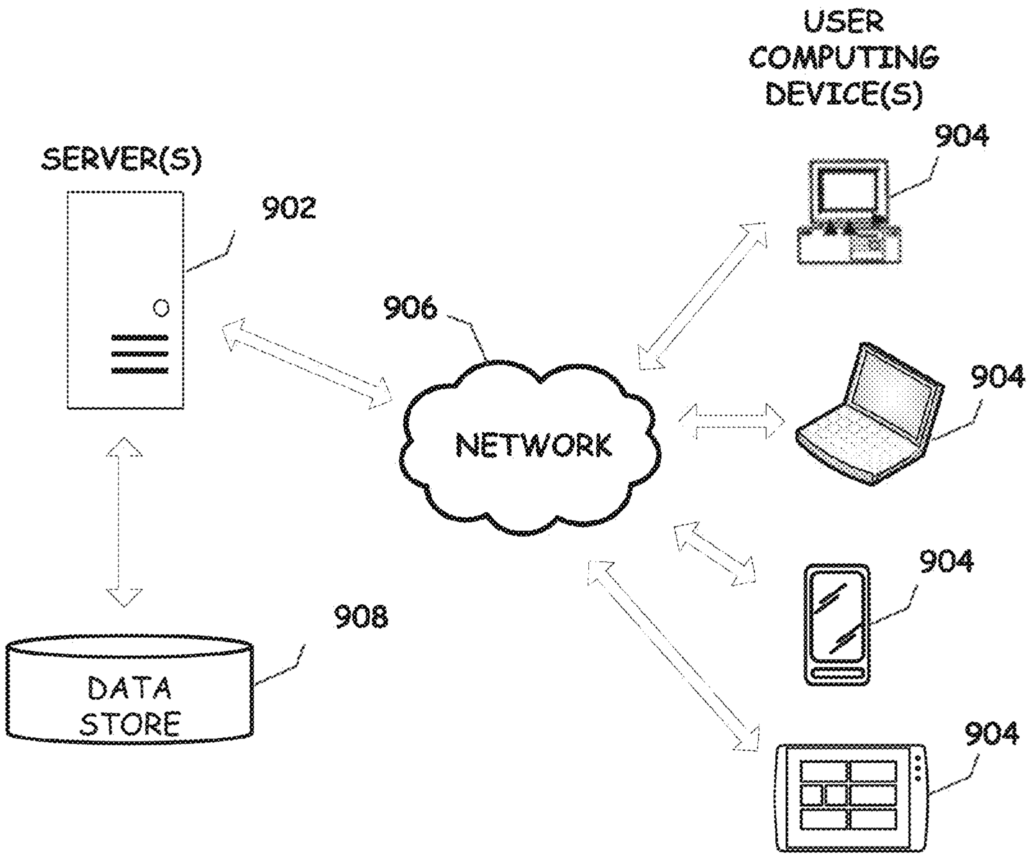
FIG. 9 illustrates some components that may be used in connection with one or more embodiments of the present disclosure.

FIG. 9 illustrates some components that may be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 902 may be configured to execute program code, instructions, etc. to provide functionality in accordance with one or more embodiments of the present disclosure.

Computing device 902 can serve content to user computing devices 904 using a browser application via a network 906. Network 906 may comprise telecom network 130. Data store 908, which can include database 150, may be used to store program code to configure a server 902 to functionality in accordance with one or more embodiments of the present disclosure.

The user computing device 904, which may be telecom device 110, for example, may be any computing device, including without limitation a personal computer, personal digital assistant (PDA), wireless device, cell phone, including without limitation a smartphone, tablet, internet appliance, media player, home theater system, and media center, and/or the like. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition may be specified using any of a number of languages, including without limitation a markup language such as Hypertext Markup Language, scripts, applets and/or the like. The user interface definition may be processed by an application executing on the user computing device 904, such as a browser application, to output the user interface on a display coupled, e.g., a display directly or indirectly connected, to the user computing device 904.

In an embodiment the network 906 may be the Internet, an intranet (a private version of the Internet), telecom network 130, or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wireline type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, and/or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and/or the like. A wireless network may include virtually any type of wireless communication mechanism by which signals may be communicated between devices, such as a client device or a computing device, between or within a network, and/or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, and/or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure may be implemented in a client-server environment such as that shown in FIG. 9. Alternatively, embodiments of the present disclosure may be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 10:
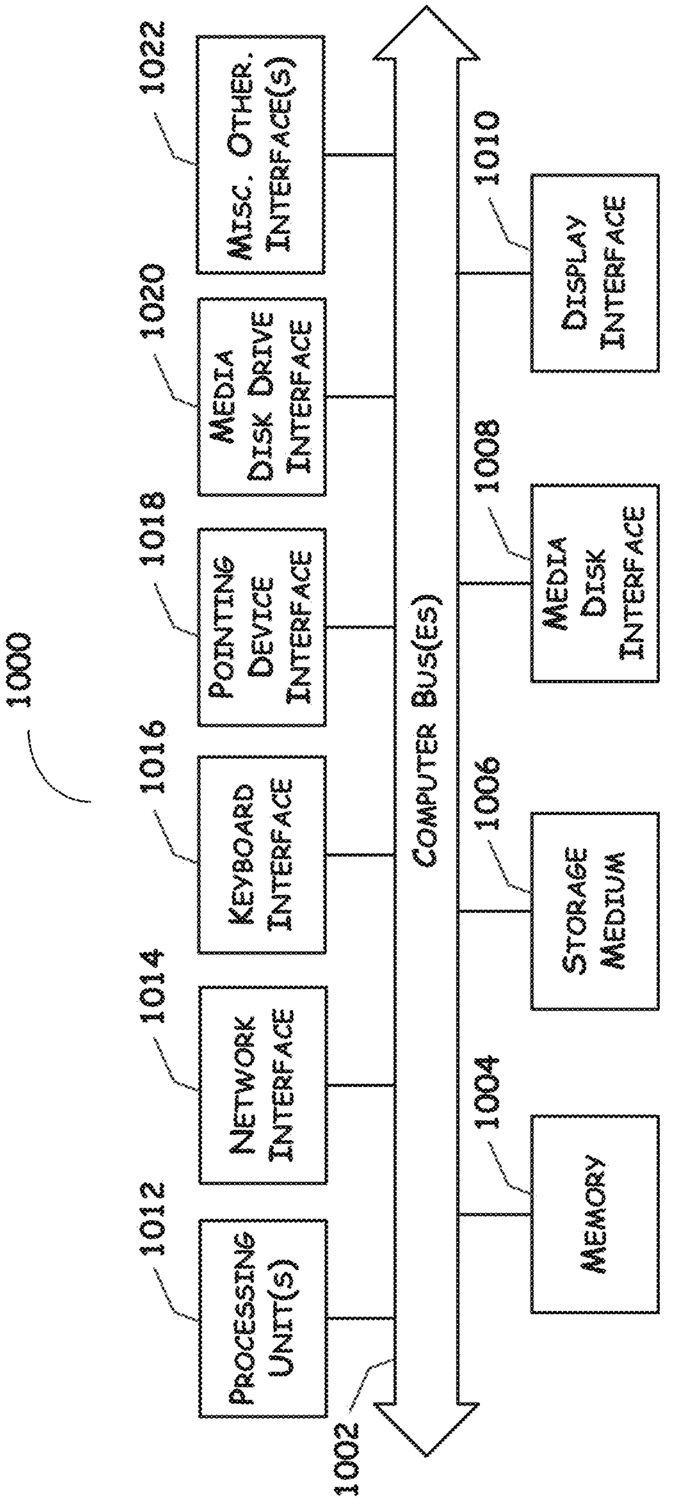
FIG. 10 is a detailed block diagram illustrating an internal architecture of a computing device in accordance with one or more embodiments of the present disclosure.

FIG. 10 is a detailed block diagram illustrating an internal architecture of a computing device, e.g., a computing device such as server 902 or user computing device 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1020 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and/or the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, may be accessed by CPU 1012 during the execution of computer-executable process steps.

Persistent storage, e.g., medium/media 1006, may be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which may be used to tangibly store the desired information or data or instructions and which may be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. It will be appreciated that other uses of the present invention are also anticipated. The described embodiments comprise different features, not all of which are required in all embodiments of the invention. Some embodiments of the present invention utilize only some of the features or possible combinations of the features. The scope of the invention is limited only by the following claims.

What is claimed is:

1. A system for providing a secondary lottery-type event relative to a first service, comprising:

a secondary client application comprising computer readable code fixed in a tangible medium at a user computing device and executable by a processor thereof to, in response to an input by a user of said user computing device to a first application associated with a first service, said input comprising other than a game-initiating input that implements a non-gaming feature of the first service, forward an output to a secondary server; and a secondary server implementing said secondary lottery-type event, said secondary server comprising one or more processors to execute and memory to store instructions to:

receive, from said secondary client application of said user computing device, said output;

generating at least one lottery entry into a lottery; and at a lottery-end period, determine if said at least one lottery entry is winning.

2. The system in accordance with claim 1 further comprising at least one lottery server in communication with said secondary server, said at least one lottery entry stored by said at least one lottery server and said at least one lottery server configured to generating a winning lottery sequence.

3. The system in accordance with claim 1 wherein said user computing device comprises a mobile communications device and said first service comprises a social media service.

4. The system in accordance with claim 3 wherein said user input comprises a request to provide content to a social media site of said social media service.

5. The system in accordance with claim 3 wherein said first application comprises a social media application associated with said social media service.

6. The system in accordance with claim 1 wherein said first application is associated with said secondary client application in response to said user providing input of said first application with said secondary client application.

7. The system in accordance with claim 6 wherein said input comprises said user dragging a displayed icon corresponding to said first application to a displayed icon of said secondary client application.

8. The system in accordance with claim 1 wherein said output comprises a numerical value and said at least one lottery entry comprises a lottery number which includes at least a portion of said numerical value.

9. The system in accordance with claim 8 wherein said numerical value comprises a telephone number or IP address.

10. The system in accordance with claim 8 wherein said secondary server generates a winning lottery number and compares said winning lottery number to said lottery number of said at least one lottery entry.

11. The system in accordance with claim 1 wherein said first service comprises an email service and said user input comprises input to send an email message.

12. The system in accordance with claim 1 wherein said first service comprises a messaging service and said user input comprises input to send a message to a third party.

13. The system in accordance with claim 1 wherein said first service comprises a telephone server and said user input comprises a telephone number.

14. The system in accordance with claim 1 wherein said secondary server awards an award when said at least one lottery entry is winning.

* * * * *